US008240911B1

(12) United States Patent
Pfeifer et al.

(10) Patent No.: US 8,240,911 B1
(45) Date of Patent: Aug. 14, 2012

(54) WIRELESS PASSIVE TEMPERATURE SENSOR

(75) Inventors: Kent B. Pfeifer, Los Lunas, NM (US); Arthur N. Rumpf, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 222 days.

(21) Appl. No.: 12/871,602

(22) Filed: Aug. 30, 2010

(51) Int. Cl.
*G01K 11/26* (2006.01)
(52) U.S. Cl. .............................. 374/117; 374/E11.011
(58) Field of Classification Search .......... 374/117–120, 374/110, 137, 184, 187, 208, E11.011
See application file for complete search history.

(56) References Cited

U.S. PATENT DOCUMENTS

| | | | | |
|---|---|---|---|---|
| 4,762,426 A * | 8/1988 | Foss | | 374/130 |
| 5,571,944 A * | 11/1996 | Pfeifer et al. | | 73/24.04 |
| 7,096,736 B2 * | 8/2006 | Pfeifer et al. | | 73/715 |
| 7,263,892 B2 * | 9/2007 | Pfeifer et al. | | 73/715 |
| 7,336,153 B2 * | 2/2008 | Malone et al. | | 374/E1.004 |
| 7,474,230 B2 * | 1/2009 | Blom et al. | | 374/E7.035 |
| 8,136,988 B2 * | 3/2012 | Geren et al. | | 374/137 |
| 2004/0052295 A1 | 3/2004 | Draxton et al. | | 374/117 |
| 2005/0028595 A1 * | 2/2005 | Pfeifer et al. | | 73/715 |
| 2006/0130588 A1 * | 6/2006 | Pfeifer et al. | | 73/703 |
| 2006/0203877 A1 * | 9/2006 | Heyman et al. | | 374/117 |
| 2007/0001850 A1 * | 1/2007 | Malone et al. | | 340/572.1 |
| 2007/0205916 A1 * | 9/2007 | Blom et al. | | 340/870.17 |
| 2007/0274371 A1 * | 11/2007 | Penavaire et al. | | 374/117 |
| 2009/0147824 A1 * | 6/2009 | Schafer et al. | | 374/183 |
| 2010/0177801 A1 * | 7/2010 | Geren et al. | | 374/117 |
| 2011/0036173 A1 * | 2/2011 | Chommeloux et al. | | 374/117 |
| 2011/0280279 A1 * | 11/2011 | Gregory et al. | | 374/152 |

OTHER PUBLICATIONS

Mingfang, "SAW temperature and humidity sensor with high resolution," Sensors and Actuators, 12 (1993) 53-56.
Scholl, "Surface Acoustic Wave Devices for Sensor Applications," Phys. Stat. Sol. (a) 185, No. 1, 47-58 (2001).
Sternhagen, "A Novel Integrated Acoustic Gas and Temperature Sensor," IEEE Sensors Journal, vol. 2, No. 4, Aug. 2002, 301-306.
Sturtevant, "Assessment of Langatate Material Constants and Temperature . . . ," IEEE Transactions on Ultrasonics, Ferroelectrics, and Frequency Control, vol. 57, No. 3, Mar. 2010.
Martin, "Highly Sensistive Temperature Sensor Using SAW Resonator Oscillator," Sensors and Actuators A, 24 (1990) 209-211.
Von Jena, "Intelligent sensor for monitoring freight-waggon working conditions," Sensors and Actuators A, 41-42 (1994) 347-353.

* cited by examiner

*Primary Examiner* — Yaritza Guadalupe-McCall
(74) *Attorney, Agent, or Firm* — Kevin W. Bieg

(57) ABSTRACT

A wireless passive temperature sensor comprising a surface acoustic wave (SAW) delay line is constructed on a piezoelectric substrate having a thermal coefficient of frequency. An array of addressable, wireless passive temperature sensors can be used to monitor an array of temperature points on a structure using a wireless reader. Each sensor can be monitored by measuring the frequency of maximum reflection in their respective bands. A wireless passive heat flux gauge uses two temperature sensors with different frequency and/or time delay responses to measure that temperature differential across a thermal conductor that has a well characterized thermal conductivity and thickness.

11 Claims, 12 Drawing Sheets

WIRELESS PASSIVE TEMPERATURE SENSOR

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to thermal measurement and, in particular, to wireless passive temperature sensor that can be used to remotely measure the spatial temperature profile and heat flux of a structure.

BACKGROUND OF THE INVENTION

Precise pre-deployment measurement of physical parameters, such as temperature and heat flow, under dynamic loads in satellite or other testing often requires adding large numbers of wires to support thermocouples or other types of probes. Not only do the wires provide a thermal conduction path that disturbs the measurement, but the wires also change the dynamics of the body during acceleration and shock testing due to their added mass. Therefore, wireless sensors are attractive for such physical measurements.

Surface acoustic wave (SAW) devices have been demonstrated to function linearly as temperature sensors over a broad range of temperature and they have been employed as wireless tags for tracking of high value assets in addition to various types of wireless sensors. See M. Viens and J. D. N. Cheeke, "Highly Sensitive Temperature Sensor Using SAW Resonator Oscillator," *Sensors and Actuators A* 24, 209 (1990); L. Mingfang and L. Haiguo, "SAW temperature and humidity sensor with high resolution," *Sensors and Actuators B* 12, 53 (1993); J. D. Sternhagen et al., "A Novel Integrated Acoustic Gas and Temperature Sensor," *IEEE Sensors Journal* 2 (4), 301 (2002); G. Scholl et al., "Surface Acoustic Wave Devices for Sensor Applications", *Phys. Stat. Sol. A* 185 (1), 47 (2001); and A. von Jena et al., "Intelligent Sensor for Monitoring Freight-Waggon Working Conditions," *Sensors and Actuators A* 42, 347 (1994). Wireless tagging and sensing applications require a method of self-identification, such as a unique photo-lithographically patterned bit sequence of reflection structures, to be fabricated on the device during manufacture. These bit sequences allow a unique identification code to be hardwired into a SAW device, enabling identification of the particular part. This bit sequence requires each part on the wafer to have a unique photo-mask and thus increases fabrication cost during dicing and packaging due to tracking requirements on that unique part. In addition, some of the energy received by the SAW device via the antenna is used for the identification and thus reduces the energy available for the sensing measurement. This loss of energy reduces the signal-to-noise ratio of the SAW temperature sensor.

For application as a sensor, there must be some environmentally introduced change in the wireless SAW response that can be detected by a readout device. An example of this type of sensor is described in the literature where the phase angle of a reflected signal is monitored as function of pressure or temperature using a network analyzer. See G. Scholl et al. This type of sensor response is good for monitoring pressure, strain, and torque but is limited by the expense and portability of the readout hardware. Further, SAW devices typically operate at frequencies in the range of 100 MHz to several GHz, making the monitoring of the phase and individual waves impractical for portable, inexpensive systems.

Therefore, a need remains for a wireless passive temperature sensor that can remotely measure the thermal profile and heat flow of a structure using a portable, inexpensive transceiver.

SUMMARY OF THE INVENTION

The present invention is directed to a wireless passive temperature sensor, comprising a surface acoustic wave delay line comprising a piezoelectric substrate having a thermal coefficient of frequency, a launch interdigital transducer, disposed on the surface of the piezoelectric substrate and adapted to launch a surface acoustic wave at a resonance frequency in the piezoelectric substrate when a RF electric field is applied across the launch interdigital transducer, and a reflection interdigital transducer, disposed in the acoustic path of and spaced a delay length from the launch interdigital transducer on the piezoelectric substrate and adapted to at least partially reflect the launched surface acoustic wave back to the launch interdigital transducer; and an antenna adapted to receive a transmitted RF pulse and apply the RF electric field across the launch interdigital transducer to launch the surface acoustic wave, and to retransmit an RF pulse from the reflected surface acoustic wave received by the launch interdigital transducer; and wherein the delay time between the launched surface acoustic wave and the received reflected surface acoustic wave of the launch interdigital transducer is dependent on the thermal coefficient of frequency of the piezoelectric substrate. A remote burst transmitter can be adapted to transmit to the antenna the transmitted RF pulse with a carrier tuned to the resonance frequency of the launch interdigital transducer. A reader can be adapted to receive the retransmitted RF pulse from the antenna. An addressable array of such temperature sensors, each with a different resonance frequency and/or delay time, can be pre-positioned for spatial thermal measurement of a remote structure, such as a satellite.

The wireless, SAW-based temperature sensor employs a relatively inexpensive, pulsed radar-type measurement, but still allows monitoring of wide temperature ranges (e.g., less that −60° C. to greater than 190° C.) with uncertainties on the order of 0.9° C. In addition, the sensor provides a primary measurement of the thermal coefficient of frequency of a substrate, allowing the measurement to be made independently of the physical distance from the powered reader to the measurement tag, within the limits of the signal-to-noise ratio. Sensors can be fabricated with different center frequency bands and transit delays allowing arrays of independent sensors to be deployed and measured. These SAW-based sensors can be designed to operate in the 915 MHz industrial, scientific, and medical (ISM) band, eliminating licensing issues for the readout hardware.

Two SAW temperature sensors with different frequency and/or time delay responses can be placed on either side of a thermal conductor that has a well characterized thermal conductivity and thickness to provide a wireless passive heat flux gauge. Since the temperature of each side of the thermal conductor will be different if heat is flowing, the different temperatures measured by the two sensors can be used to calculate the heat flux through the thermal conductor.

BRIEF DESCRIPTION OF THE DRAWINGS

The accompanying drawings, which are incorporated in and form part of the specification, illustrate the present invention and, together with the description, describe the invention. In the drawings, like elements are referred to by like numbers.

DETAILED DESCRIPTION OF THE INVENTION

The wireless passive temperature sensor of the present invention is based on the change in minimum insertion loss of a SAW delay line that allows for large arrays of self-identifying sensors to be pre-positioned for thermal measurement of a structure. The sensors do not require batteries that add unacceptable mass to the structure or wires to retrieve the data, enabling remote sensing. These sensors have a very linear response over a range of less than −60° C. to greater than 190° C. and allow wireless measurements that eliminate the mechanical and thermal disturbance that occur for hard-wired systems. Variation of the SAW characteristic delay and center frequency allow the manufacture of inexpensive, robust, self-identifying sensor element arrays that can be read using a single antenna and data acquisition system. Therefore, a measurement method can use an array of these SAW-based sensors and passive RF to measure the spatial temperature profile of a structural body, such as a satellite or aeroshell. The sensors have been demonstrated on several large mechanical structures and found to perform comparable to thermocouples.

Figures 1A, 1B:
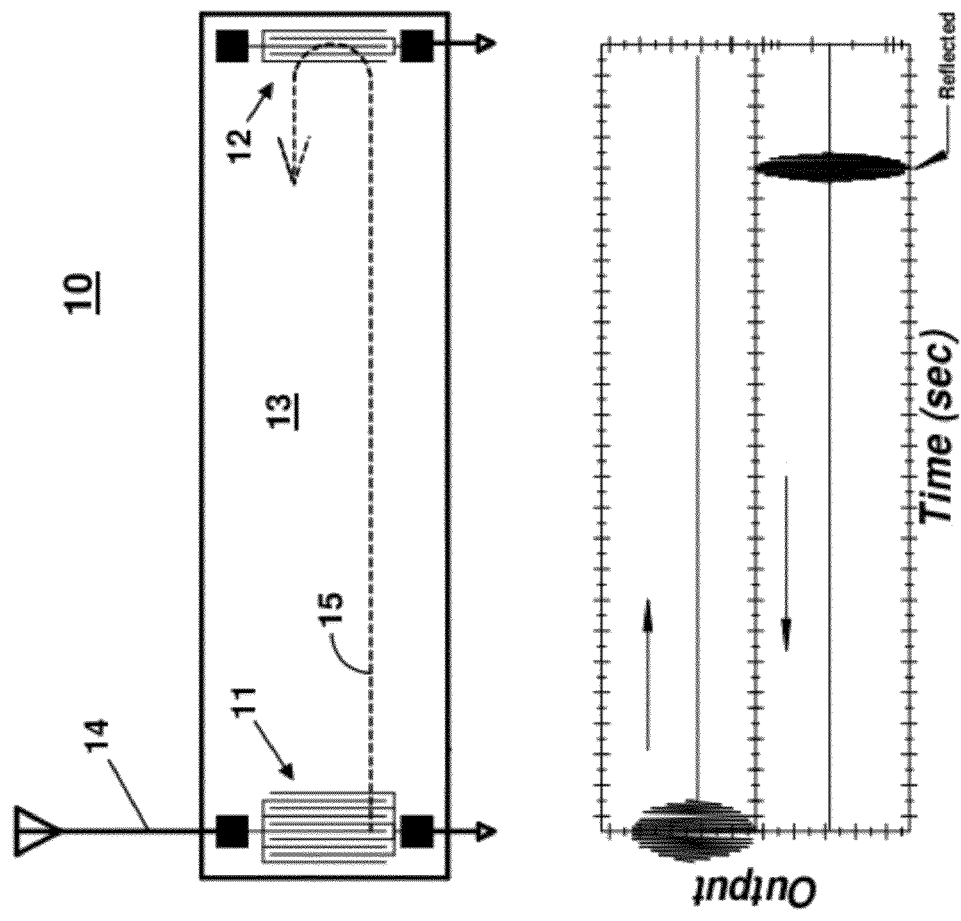
FIG. 1A is a schematic illustration of a wireless passive temperature sensor comprising a surface acoustic wave (SAW) delay line is constructed on a piezoelectric substrate, such as lithium niobate (LiNbO$_3$).
FIG. 1B shows the launch and reflected SAWs. Delay and resonant frequency are determined by the center-to-center spacing between the transducers and the transducer finger spacing, respectively.

FIG. 1A is a schematic illustration of a wireless passive temperature sensor 10 of the present invention. The sensor 10 comprises a SAW delay line, comprising two sets of comb-like interdigital transducers (IDTs): a launch IDT 11 and a reflection IDT 12. Each IDT comprises a fingerlike periodic pattern of parallel in-plane electrodes disposed on the surface of a piezoelectric substrate 13. The substrate 13 preferably comprises a piezoelectric material with a high mechanical coupling coefficient, a high thermal coefficient of frequency, and a high thermal conductivity to ensure good thermal contact to a structure. For example, the piezoelectric substrate 13 can be LiNbO$_3$, LiTaO$_3$, GaAs, quartz, or other suitable piezoelectric substrate. Delay is determined by the center-to-center spacing between the opposing transducers 11 and 12. Resonant frequency is determined by the finger spacing of the IDT electrodes. If an electric field is applied across the launch IDT 11, a strain is induced in the piezoelectric substrate 13 as a result of its piezoelectric nature. The electric field can be applied wirelessly using a burst transmitter (not shown) operating with a carrier tuned to the resonance frequency of the receiving launch IDT 11 and connecting the receiving transducer 11 to an antenna 14. The antenna can be a monopole, dipole, or a directional antenna that is effective in the particular application. RF energy from the burst transmitter is captured by the antenna 14 and converted into an electrical signal across the receiving transducer 11; the induced mechanical strain will then launch an acoustic wave 15 across the surface of the piezoelectric substrate 13. The surface acoustic wave 15 is at least partially reflected by the reflection transducer 12 in the acoustic path. The reflection transducer 12 can comprise an identical IDT to the launch transducer 11, thereby providing a tuned reflector to the acoustic wave 15 on the surface. The reflection is large if the impedance of the reflection IDT is mismatched. When the reflection transducer is electrically matched, the reflection is small since the energy is efficiently dissipated in the matching network. Similarly, when the transducer is connected to an electrical open circuit, the reflection is large since the energy is not dissipated due to the large mismatch at the reflection transducer. The reflected wave can be reconverted into an electromagnetic pulse by the launch transducer 11 and retransmitted by the antenna 14 to a reader (not shown). See D. S. Ballantine et al., *Acoustic Wave Sensors: Theory, Design, and Physico-Chemical Applications*, San Diego, Calif., Academic Press, pg. 77 (1997); and K. B. Pfeifer et al., "Surface Acoustic Wave Sensing of VOC's in Harsh Chemical Environments," SAND-93-0070, pp. 7-30 (1993).

Temperature Sensor Theory

Figure 2:
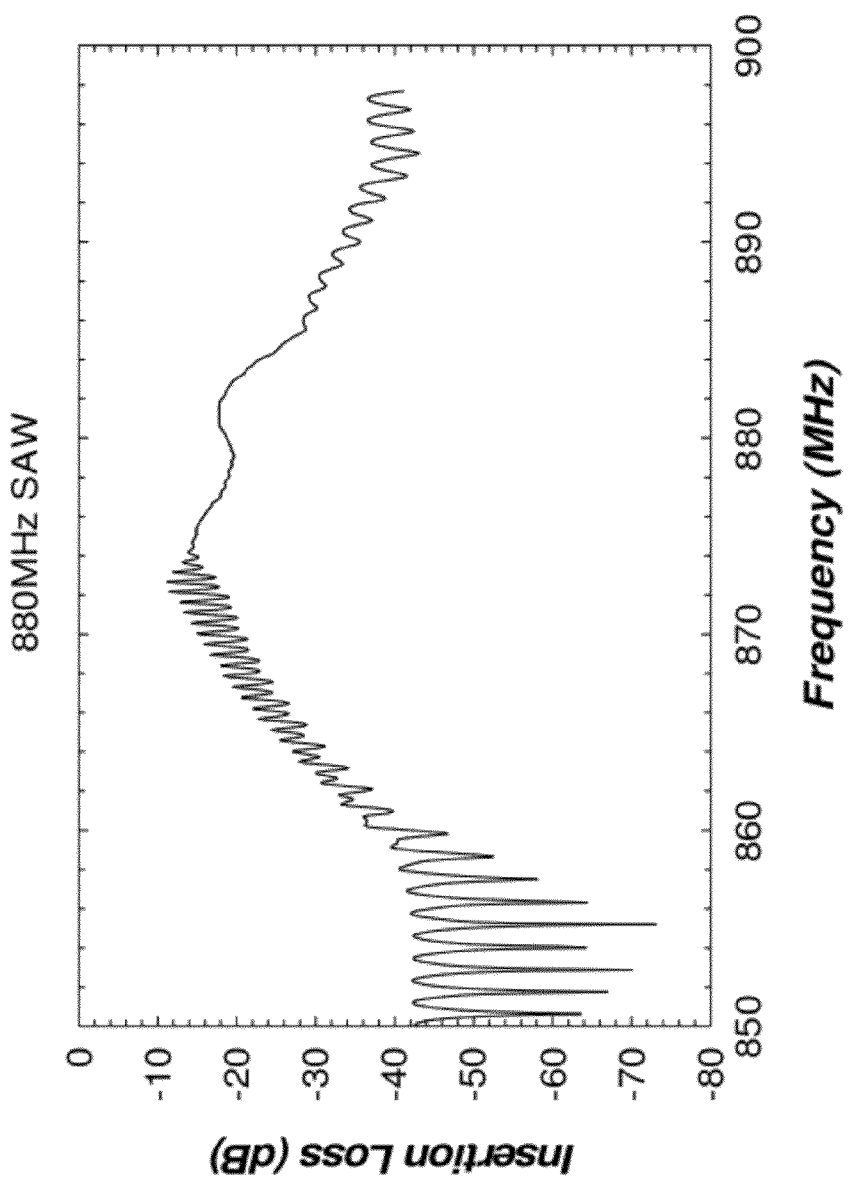
FIG. 2 is a graph of a $S_{12}$ measurement of a LiNbO$_3$ SAW device with nominal 880 MHz center frequency.

FIG. 2 is a graph of the $S_{12}$ scattering parameter of a LiNbO$_3$ SAW device with nominal 880 MHz center frequency, measured with a network analyzer. The minimum insertion loss occurs at the center of the main lobe. The center-band frequency for the IDT of a SAW device is given as:

$$f = \frac{v_p}{\lambda}, \tag{1}$$

where $v_p$ is the phase speed of the Rayleigh wave (3488 m/sec for LiNbO$_3$) and $\lambda$ is twice the center-to-center spacing between the fingers of the transducer. See D. S. Ballantine et al.

Defining the thermal coefficient of frequency (TCF, $\alpha_f$) for the resonance of the SAW delay line as follows, a relationship between the temperature and the change in frequency as a function of temperature can be derived. See B. T. Sturtevant and M. Pereira da Cunha, "Assessment of the Langatate Material Constants and Temperature Coefficients Using SAW Delay Line Measurements," *IEEE Transactions on Ultrasonics, Ferroelectrics, and Frequency Control* 57 (3), 533 (2010).

$$\alpha_f = \frac{1}{l_0}\frac{dl(T)}{dT} + \frac{1}{v_{po}}\frac{dv_p(T)}{dT} \quad (2)$$

In Eq. (2), l(T) is the length of the acoustic path between the two interdigital transducers of the SAW delay line at a temperature T and $l_o$ is the nominal path length between the two interdigital transducers at some arbitrary calibration temperature ($T_o$). Likewise, $v_p$ is the acoustic phase velocity of the surface acoustic wave along the path between the two transducers which is also a function of temperature due to thermal variations in the density of the material. In Eq. (2), the first term on the right hand side is the static thermal coefficient of expansion ($\alpha'$) which lengthens the spacing between the fingers of the SAW transducer with increasing temperature, causing the resonant frequency of the SAW device to decrease (negative sign). The second term on the right hand side of the equation is a correction term that predicts a decrease in frequency with a decrease in acoustic phase velocity ($v_p$), as is implied by Eq. (1). Thus, since the phase velocity will decrease with decreasing substrate density and the substrate density will decrease with increasing temperature, both of the terms of Eq. (2) add together resulting in a larger value of $\alpha_f$ than would be expected from thermal expansion alone.

Assuming small perturbations in the length and phase velocity over the range of temperature change and recognizing that the ratio of the change in acoustic path length to total acoustic path length is equivalent to the ratio between the change in acoustic wavelength and the nominal wavelength at the calibration temperature, Eq. (2) can be rewritten as follows:

$$\alpha_f = -\frac{1}{\lambda_0}\frac{d\lambda(T)}{dT} + \frac{1}{v_{po}}\frac{dv_p(T)}{dT} \quad (3)$$

The derivative of Eq. (1), where all of the terms are functions of temperature is written as follows:

$$\frac{df}{dT} = \frac{1}{\lambda}\frac{dv_p}{dT} - \frac{v_p}{\lambda^2}\frac{d\lambda}{dT} \quad (4)$$

Eq. (4) reduces to:

$$\frac{1}{f}\frac{df}{dT} = \frac{1}{v_p}\frac{dv_p}{dT} - \frac{1}{\lambda}\frac{d\lambda}{dT} \quad (5)$$

Combining Eq. (3) and Eq. (5), the slope of the change in frequency as a function of temperature can be written as:

$$\alpha_f f_o = \frac{df}{dT} \quad (6)$$

where $f_o$ is the resonance frequency of the SAW at the calibration temperature. Integration of Eq. (6) leads to a linear relationship between temperature difference and frequency of a SAW device:

$$\int_{f_o}^{f(T)} df = \alpha_f f_o \int_{T_o}^{T} dT \quad (7)$$

$$f(T) = \alpha_f f_o (T - T_o) + f_o$$

Eq. (7) implies that for temperature shifts that are not extreme, the resonant frequency of the SAW device is a linear function of the temperature difference between the calibration temperature ($T_o$) and the ambient temperature of the SAW substrate. The slope of the equation is $f_o\alpha_f$, where $\alpha_f$ is the thermal coefficient of frequency. This slope can be determined experimentally. Accordingly, for a series of devices with different frequency bands from 840 MHz to 920 MHz with varying transducer-to-transducer lengths, the average value of $f_o\alpha_f$ was determined to be −0.075 MHz/° K for this exemplary sensor. Thus, read-out hardware/software to operate a SAW-based sensor will have as an input, the quiescent temperature of the sensor and the corresponding frequency at that temperature allowing a single-point calibration of the sensor.

Values of the thermal coefficient of expansion (TCE) for LiNbO$_3$ parallel to the Z-axis are found to be temperature dependent and range from $0.75\times10^{-6}$/° K to $4.0\times10^{-6}$/° K. See J. S. Browder and S. S. Ballard, "Thermal Expansion Data for Eight Optical Materials for 60 K to 300 K," *Applied Optics* 16 (12), 3214 (1977); A. J. Slobodnik, Jr., "The Temperature Coefficients of Acoustic Surface Wave Velocity and Delay on Lithium Niobate, Lithium Tantalate, Quartz, and Tellurium Dioxide," Air Force Systems Command, AFCRL-72-0082, 22 Dec. 1972, pg. 95; and X. Xu et al., "Anisotropic Thermal Expansion of Stoichiometric Lithium Niobate Crystals Grown Along the Normal Direction of Facets," *Optical Materials* 26, 489 (2004). The value of TCE depends on the particular cut of the LiNbO$_3$ single crystal and, if considered alone, would predict a temperature coefficient of frequency of −3.6 KHz/° K, which is significantly smaller than measured. For example, consider a wafer cut with the Y-axis perpendicular to the wafer and the SAW wave oriented parallel to the Z-axis. Calculations of the expected TCF ($\alpha_f$) of this orientation were made using a SAW modeling code and were found to be on the order of −99 ppm/° K. See D. W. Branch and T. L. Edwards, "Love Wave Acoustic Array Biosensor Platform for Autonomous Detection," IEEE Ultrasonics Symposium, 260 (1997); and D. W. Branch, "Hybrid Method for the Precise Calculation of the General Dyadic Greens Functions for the SAW and Leaky Wave Substrates," Sandia National Laboratories Report., Albuquerque, N. Mex., May 2008, SAND2008-2262, pp. 3-18. For SAW devices in the 900 MHz band, the predicted value of −$f_o\alpha_f$ is approximately −0.089 MHz/° K, which is more consistent with the measured value of −0.075 MHz/° K.

Temperature Sensor Measurement

Figure 3:
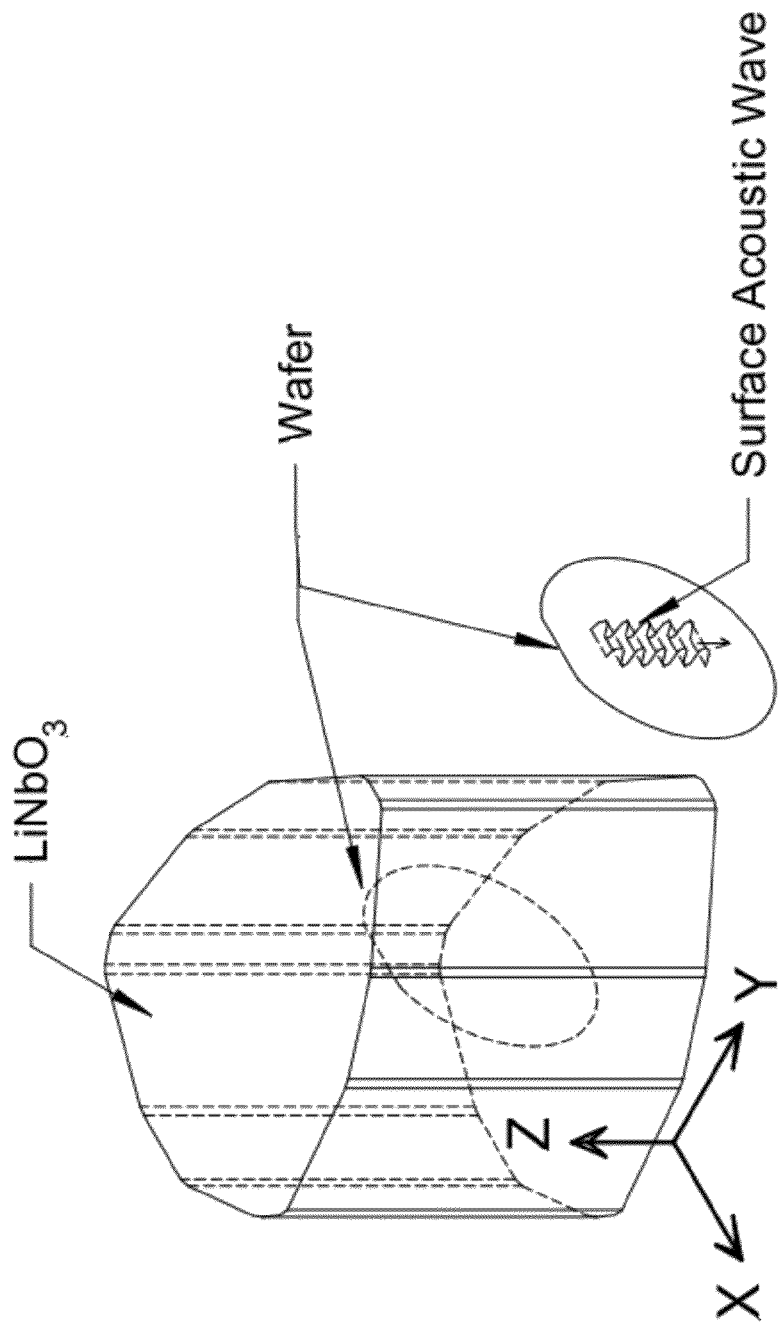
FIG. 3 is a diagram of a LiNbO$_3$ boule and the cut of wafers that can be used for the SAW device. A surface acoustic wave travels along the ±Z-axis.

Exemplary SAW-based sensors were fabricated using a typical photo-lithography process on LiNbO$_3$ cut orthogonal to the Y-axis, with the flat perpendicular to the Z axis. As shown in FIG. 3, the propagation direction of the surface acoustic wave was parallel to the Z-axis. See R. S. Weis and T. K. Gaylord, "Lithium Niobate: Summary of Physicals Properties and Crystal Structure," *Appl. Phys. A* 37, 191 (1985). The substrate was patterned with Au/Al transducers. As shown in Table 1, the transducers on the five different sensors consisted of aluminum IDTs with finger spacing designed to operate at five different frequencies.

TABLE 1

SAW center frequency (MHz) and finger spacing (μm) for the five SAW sensors tested.

| Nominal SAW Center Frequency (MHz) | Center-to-Center Finger Spacing (μm) |
|---|---|
| 840 | 1.038 |
| 860 | 1.015 |
| 880 | 0.990 |
| 900 | 0.970 |
| 920 | 0.948 |

Figure 4:
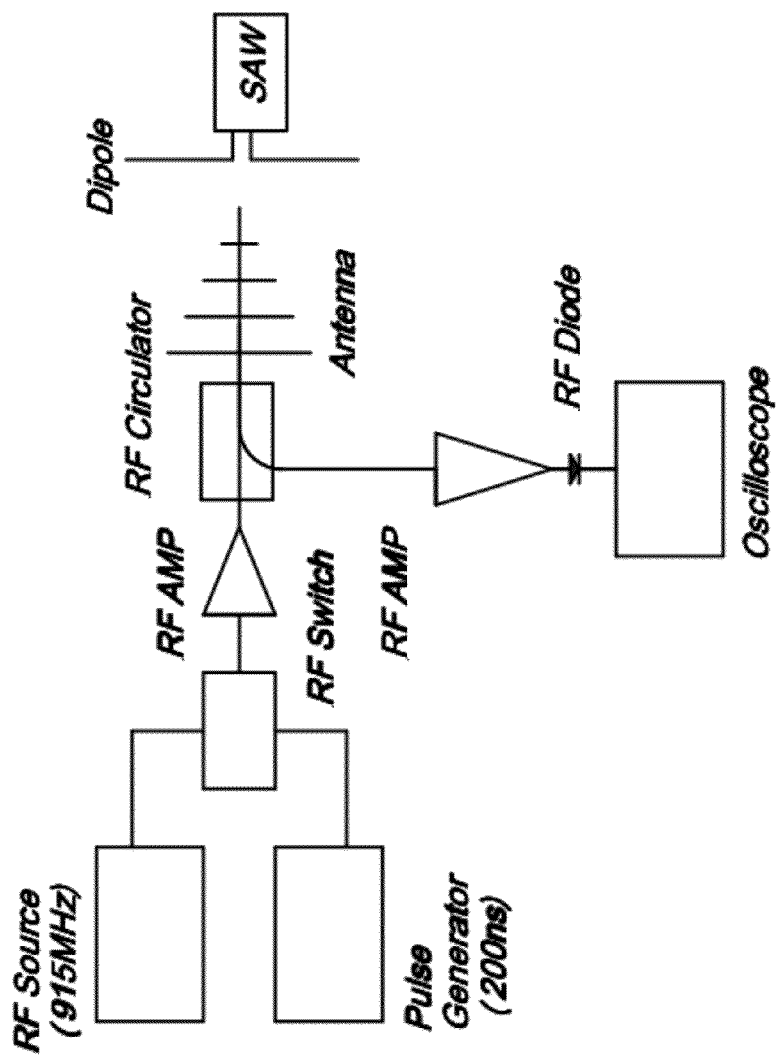
FIG. 4 is a schematic illustration of a wireless transceiver, comprising a burst transmitter and SAW delay line reader.

FIG. 4 shows the electronic circuit of a wireless transceiver comprising a burst transmitter and a SAW delay line reader that was constructed to test the functionality of the system. A pulse generator was designed to provide a 200 ns digital pulse that was used to actuate an RF switch. The pulse generator was coupled to the RF switch along with a −30 dBm to −20 dBm continuous wave (CW) RF signal from an RF synthesizer. A high-quality RF synthesizer was used for the laboratory tests; however, for a practical hand-held instrument, a small commercial off-the-shelf tunable oscillator can be used. Together, the output of the RF switch was a 100% modulated 200-ns long burst of RF energy that was coupled to an RF amplifier. This signal was then transmitted to the launch transducer of a SAW delay line via an RF circulator and an RF antenna. The gain of the RF amplifier was on the order of 28 dB and the insertion loss of the RF circulator was specified at 0.4 dB, indicating that peak power levels at the antenna were between −3.6 dBm and 6.4 dBm. The reflected signal from the SAW delay line was coupled from the antenna via the circulator to a series RF pre-amplifier and into an RF detector diode for envelope detection and finally into an oscilloscope. The oscilloscope was triggered from the pulse generator to allow synchronized averaging of the received signals and also was used to store the data in a comma separated text format via its internal disk drive.

Figure 5:
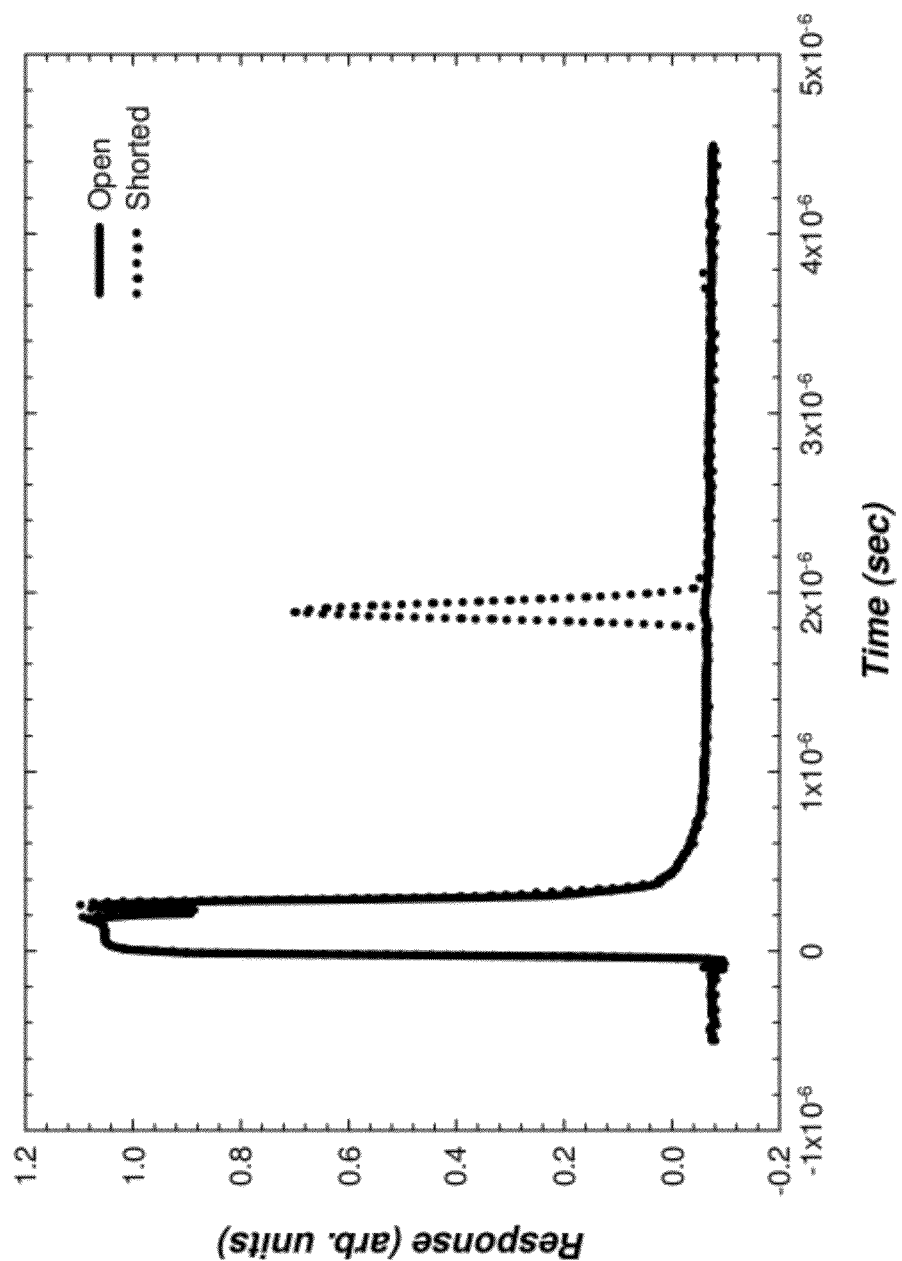
FIG. 5 is a graph illustrating the reflected RF envelope for a SAW delay line with a short on the reflection transducer compared to the reflection for the same device with an open on the output reflection transducer.
Figure 6:
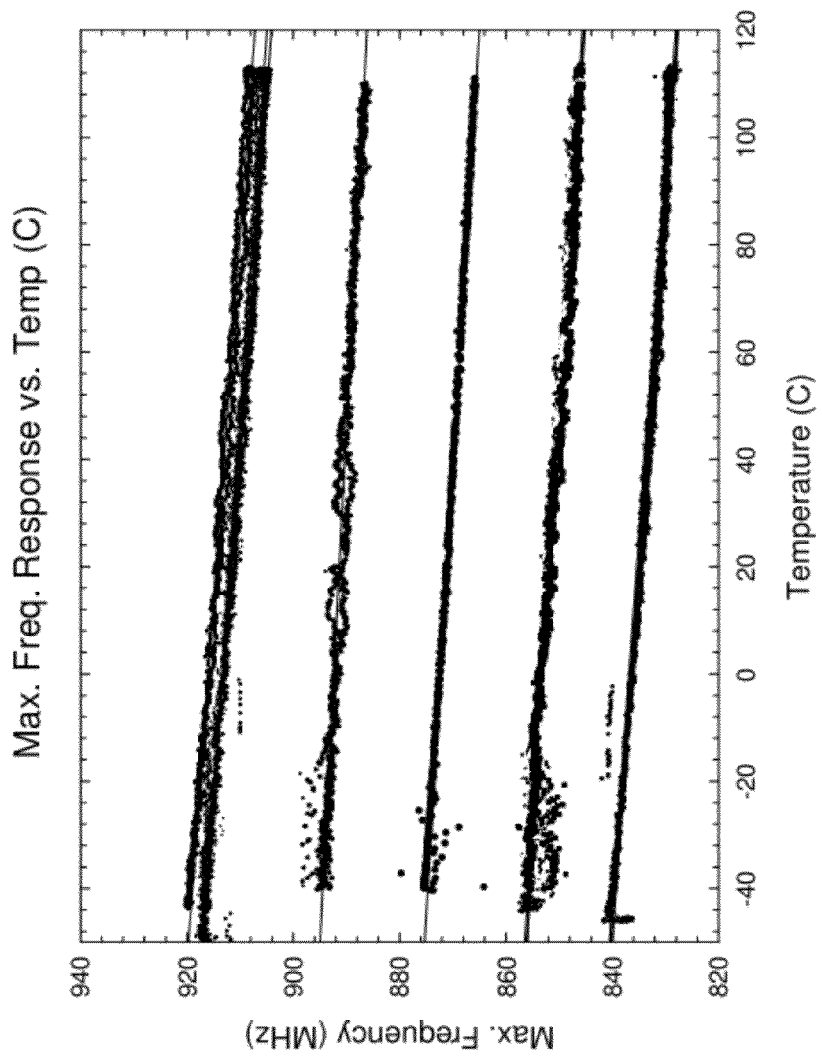
FIG. 6 is a graph of maximum reflection frequency as a function of temperature for five discrete frequencies. The slope is consistent to within ±5% implying that a single point calibration is all that is needed for the sensor.

FIG. 5 shows an example of the typical data received from a SAW reflector, illustrating the reflected RF envelope for a SAW delay line with a short on the reflection transducer compared to the reflection for the same device with an open on the output reflection transducer. The graph shows the amplified RF envelope observed as the reflection transducer is shorted to a matching network and then opened. The data illustrates the cross-talk observed in the circuit during the broadcast of the RF pulse (0-400 nsec). The first peak is the envelope of the RF burst leaking into the receiver. However, the delay introduced by the SAW delay line allows for RF interference to subside prior to the detection of the signal reflected from the SAW. As is illustrated, the pulse amplitude around 2 μsec is modulated by alternately shorting to a matching network and opening the reflection transducer connections. The signal-to-noise ratio in this example is on the order of 40 dB, indicating that measurements of amplitude change are possible over a moderately wide dynamic range FIG. 6 is a graph of maximum reflection frequency as a function of temperature for five discrete frequencies. The data was collected using the RF circuit of FIG. 4. The method used was to send a series of 200 ns bursts of RF energy from the transmitter antenna to the sensor with various carrier frequencies and then record the amplitude of the delayed reflected pulse using the oscilloscope. The amplitudes of the reflected pulses were compared and the frequency corresponding to the maximum pulse amplitude was plotted as a function of the temperature. This was done for several sensors with resonant frequencies from 840 MHz to 920 MHz (i.e., the frequency corresponding to the resonance at −50° C.). It was found that while the y-intercept of the linear fit to the data has a different value depending on the resonance frequency of the particular sensor, the slope of the response has a consistent value of −0.073±0.005 MHz/° K for all of the tested sensors. This value is within 15% of the value of the slope calculated by the computer model, and indicates that the effect is predominately due to the dynamic stiffening effect on the substrate rather than the static thermal expansion coefficient. This effect was demonstrated over temperature ranges of −60° C. to 190° C. and was found to be linear over the entire range. Thus, a single point measurement is all that is necessary to calibrate each individual sensor.

Therefore, an addressable array of sensors with different resonance frequencies and/or delay times can be used to uniquely measure the spatial temperature profile of a structural when the frequency bands and/or delay times do not overlap within the temperature range of interest. Similar array measurements can be made by placing sensors at known points on a structure and then probing the particular point's temperature with no cross-talk between points. Because the center band frequency and/or time delay is used to identify the sensor, all of the received energy can be used to the sensing measurement, thereby improving the signal-to-noise of the sensor as compared to sensors that require a unique bit sequence for identification.

With this method of read-out of the sensors is that the amplitude of the reflected pulse is only compared relative to the maximum amplitude as the frequency is varied over the band and is not compared to an absolute value. This allows each sensor to have a slightly differing insertion loss without effecting the measurement. Since the measurement is relative only to the maximum reflection amplitude on that sensor, sensors at different ranges with different amplitudes of return can be measured using a single stationary antenna. In addition, effects on accuracy and resolution of sensors with differing insertion loss due to variations in processing over the area of the wafer or from wafer-to-wafer are eliminated.

Examination of FIG. 6 illustrates that there is some uncertainty in the frequency measurement that translates directly into uncertainty in the temperature for each of the sensors. The origin of this noise is in the discrete approach to acquiring the data from the scope at discrete frequencies from the RF generator. Typical measurements were made by programming the computer to scan through a series of frequencies and select the frequency with the maximum peak return amplitude. The rate at which the system could measure a sensor and determine its frequency was related to the size of each frequency step. A very fine frequency step results in a better measurement of the frequency of maximum return, but requires more time to accomplish. This can be a problem if the temperature is drifting rapidly in time.

To decrease the measurement interval and improve the quality of the measurement, a non-linear least squares fit was done to a $2^{nd}$ order polynomial around the amplitude vs. frequency peak. See M. G. Natrella, *Experimental Statistics*, National Bureau of Standards Handbook 91, United States Department of Commerce, pp. 6-3 (1963). The derivative of the polynomial can be solved using the fitted parameters to estimate the frequency of maximum return. FIG. 6 shows the improvement in the results for the 880 MHz sensor compared to the other four sensors which were not fitted using this technique. The uncertainty in the frequency is much less than the diameter of each data point. In the traces for the other sensor, the uncertainty is larger.

Another feature of the plotted data occurs at temperatures below −20° C. where the data tends to become noisy. This effect is due to condensation of H2O onto the surface of the SAW delay line and the resulting increase in insertion loss of the sensor. With too much insertion loss the program has problems tracking and determining the frequency of maximum reflection resulting in noise. This problem can be solved using SAW delay lines that are packaged in hermetic sealed volumes with low frost points.

Figure 7:
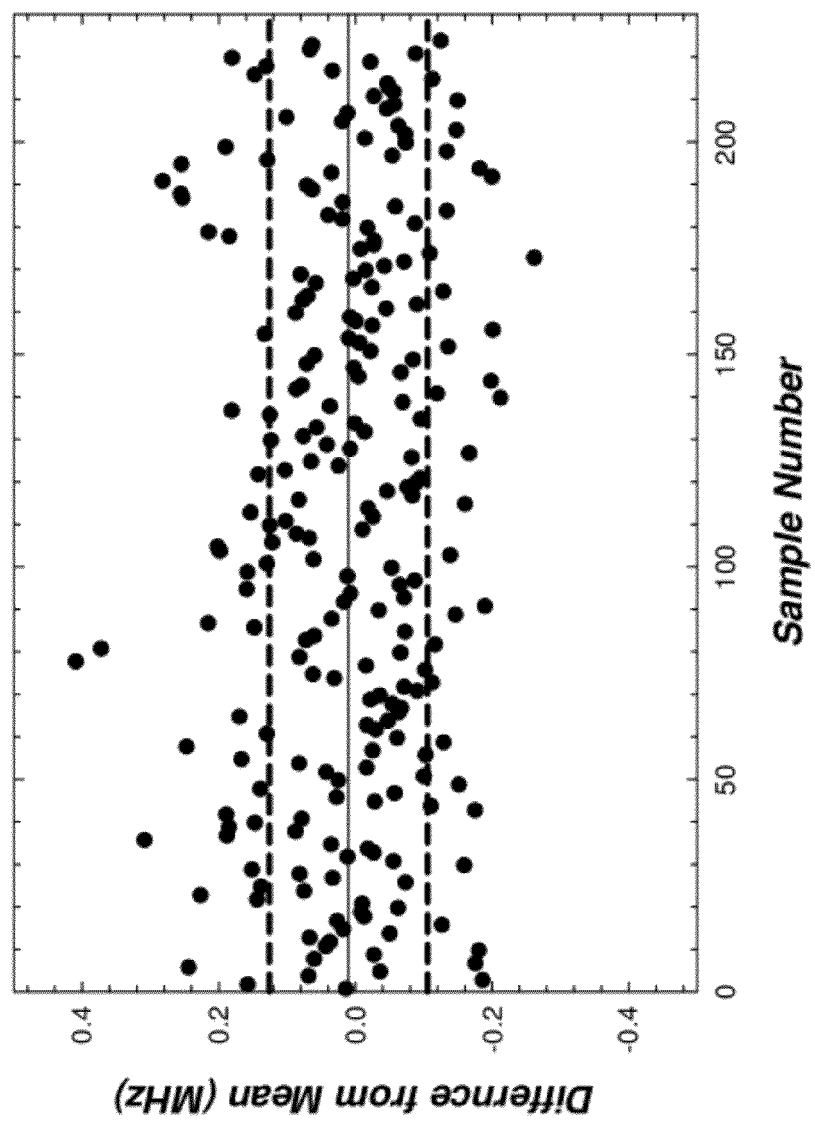
FIG. 7 is a graph of distribution for 241 measurements of 24.8° C. using a single sensor. The mean of the data set was calculated and then subtracted from each point such that the deviation from the mean is plotted. The dashed horizontal lines are one standard deviation from the mean.
Figure 8:
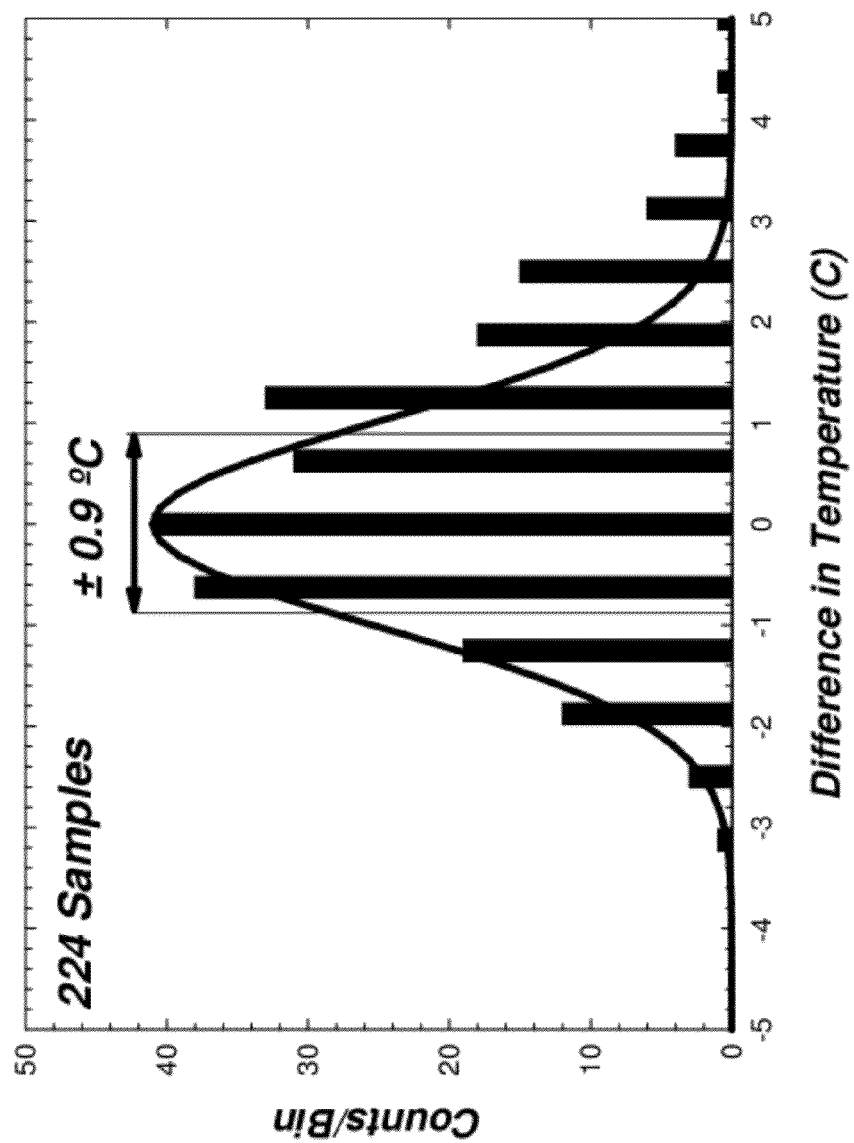
FIG. 8 is a graph of the distribution of the data of FIG. 7 as a function of temperature. Data indicate good agreement with a Gaussian distribution and give a standard deviation of the temperature of ±0.9° C.

Using this data fit technique, results from 224 measurements of one sensor at a single temperature of 24.8° C. were collected. This data is plotted in FIG. 7 and illustrates the deviation from the mean over the sampling. The results are plotted as a histogram and fit to a Gaussian distribution in FIG. 8. The data of FIG. 8 implies that the sources of noise in the experiment are uncorrelated and have their origin in the electronics and other thermal sources. The Gaussian fit indicates an uncertainty in the measurement on the order of 0.9° C.

Figure 9:
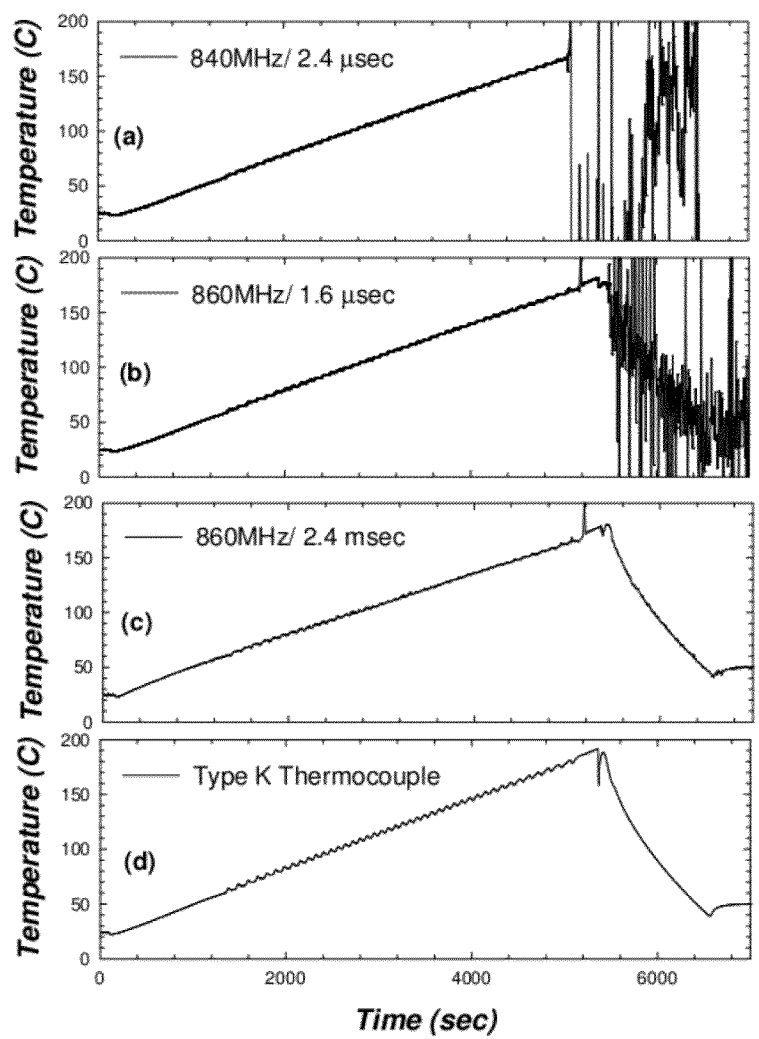
FIG. 9 is a graph of three SAW devices (840 MHz/2.4 µsec delay (a), 860 MHz/1.6 µsec (b), and 860 MHz/2.4 µsec delay (d)) plotted as a function of time and compared to a type K thermocouple.

FIGS. 9(a)-(c) are graphs of the response of three sensors operating simultaneously in the chamber as a function of time. The data is compared to a type K thermocouple in FIG. 9(d). The data indicate good agreement between the sensors and the thermocouple until about 180° C. when the 840 MHz/2.4 μsec delay sensor fails, as shown in FIG. 9(a). This is followed by the failure of the 860 MHz/1.6 μsec sensor at 191° C., as shown in FIG. 9(b). At this point the temperature of the chamber was reset to 23° C. and the sensors were allowed to cool. FIG. 9(c) indicates that some sensors will survive at these temperature extremes. Post examination of the sensors indicated that 60/40 Pb/Sn solder connections to the mounting board were responsible for the failure. The sensors were repaired by resoldering the connection. Both sensors were still functional when re-assembled, indicating that the crystal/Au/Al patterning was intact. Therefore, the absolute maximum temperature at which these sensors will function without failure is greater than 190° C. The upper temperature limit can be increased by improving the packaging limitations of the current sensors.

Figure 10:
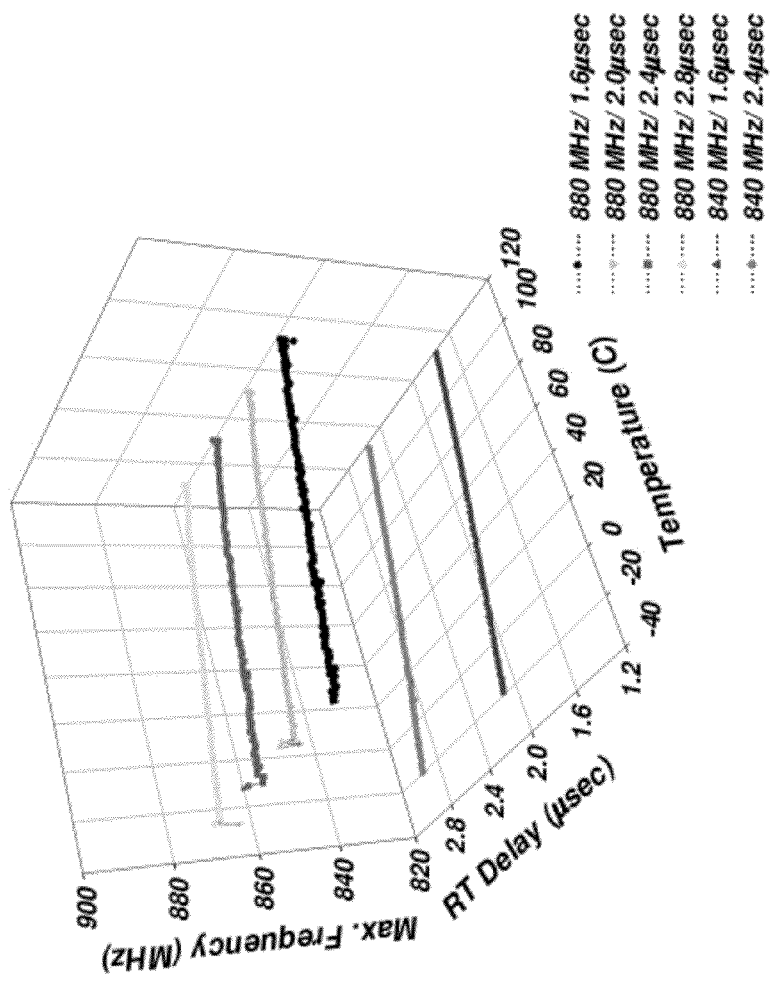
FIG. 10 is a graph of response for six sensors measured simultaneously using one antenna in a temperature controlled chamber.

FIG. 10 shows a graph of the response of six sensors under test simultaneously in a chamber. The six sensors were separated by resonance frequency (880 MHz and 840 MHz) and by round-trip delay time (1.6 μsec, 2.0 μsec, 2.4 μsec, and 2.8 μsec). Four sensors with 880 MHz resonances had 1.6 μsec, 2.0 μsec, 2.4 μsec, and 2.8 μsec delay times, and two sensors with 840 MHz resonances had 1.6 μsec and 2.4 μsec delay times. These data show excellent agreement of maximum frequency vs. temperature slope.

As indicated above, by producing sensors with different resonance frequencies and/or delay times an addressable array of sensors can be assembled and read. For a large array of sensors, a combination of time multiplexing and correlation can be employed to uniquely identify individual SAW sensors. This can be done by constructing correlator-type transducers that are uniquely coded for identification of the SAW. Thus, the combination of time delay and correlation allow for the unique identification of multiple devices and hence, sensor points. This enables construction of large arrays of wireless passive sensors.

Temperature Sensor with Built-in Reference

Figure 11:
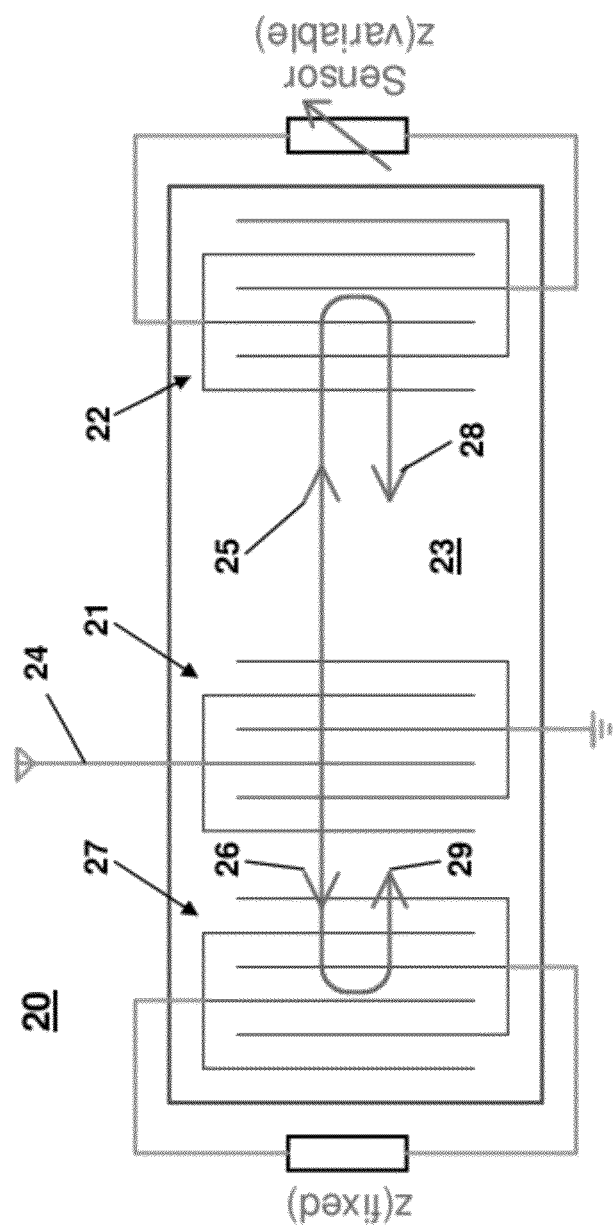
FIG. 11 is a schematic illustration of a SAW temperature sensor with a built-in signal reference.

An issue can be the variation of the reflected pulse amplitude as a function of transmitter to SAW distance. FIG. 11 is a schematic illustration of a temperature sensor 20 with built-in signal reference. An electric field can be applied wirelessly using a burst transmitter (not shown) operating with a carrier tuned to the resonance frequency of a receiving launch IDT 21 and connecting the receiving transducer 21 to an antenna 24. RF energy from the burst transmitter is captured by the antenna 24 and converted into an electrical signal across the receiving transducer 21; the induced mechanical strain will then launch acoustic waves 25 and 26 in both directions across the surface of the piezoelectric substrate 23. The surface acoustic wave 25 is at least partially reflected 28 by a sensor transducer 22 in the acoustic path. The sensor transducer 22 can be connected to a temperature sensor with variable impedance. A fixed amplitude reference is provided by a second IDT 27 with fixed impedance. Therefore, acoustic waves are launched in both directions and return at different times due to different delay path lengths from the opposing transducers 22 and 27. In this example, the first reflected pulse 29 is received from the fixed transducer 27 at an earlier time due to its shorter path length. The signal pulse 28 is received from the sensor transducer 22 at a later time and the ratio of the amplitudes of the two reflected pulses provides the power-corrected signal from the sensor transducer. Therefore, the ratio allows for compensation due to differences in transmitted RF power and distance of the sensor 20 from the wireless transceiver.

Heat Flux Gauge

Figure 12:
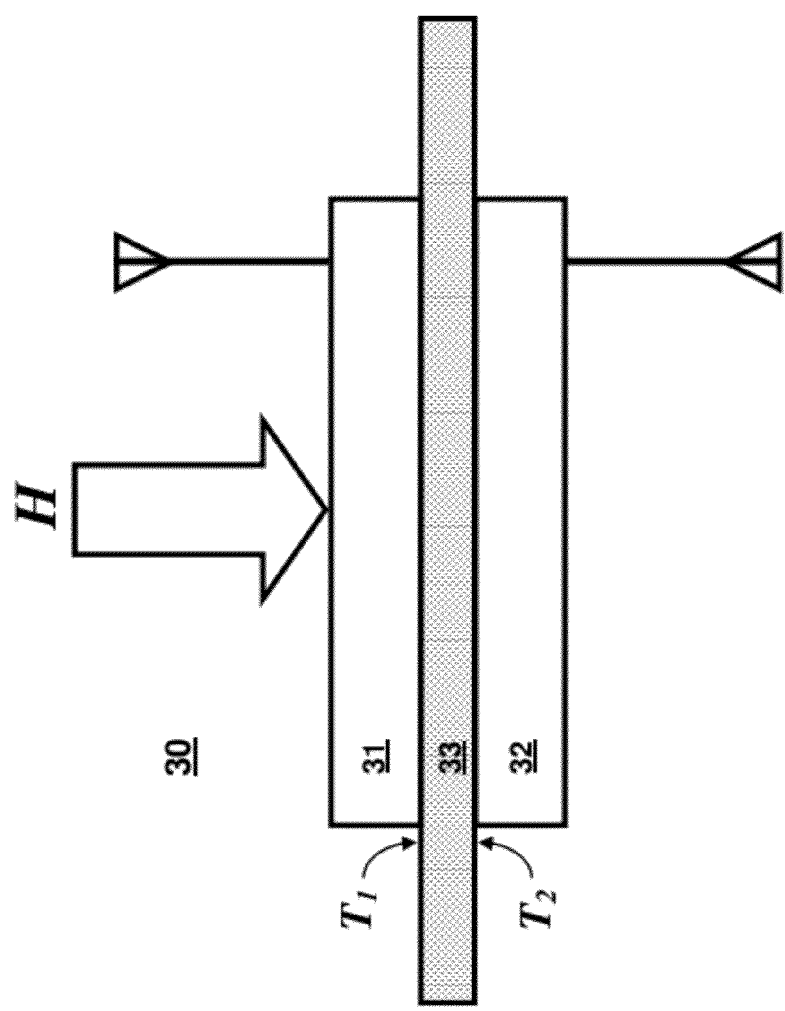
FIG. 12 is a schematic illustration of a wireless passive heat flux gauge using two SAW sensors to measure the temperature differential across a thermal conductor.

Heat flux can be determined by measuring the temperature on both sides of a material that has a well characterized thermal conductivity. Combinations of SAW devices either with different resonant frequency, time delay, or both, enables a wireless passive heat flux gauge 30, as shown in FIG. 12. In this example, two SAW temperature sensors 31 and 32 with different individual responses are placed on either side of a thermal conductor 33 that has a well characterized thermal conductivity and thickness, such as Kapton. Since the temperatures $T_1$ and $T_2$ of each side of the material 33 will be different if heat is flowing, two wireless temperature measurement sensors enables the calculation of the heat flux (H) according to:

$$H = k\frac{\Delta T}{L} \quad (8)$$

where $\Delta T$ is the difference in temperature $(T_1 - T_2)$ measured from the two sensors 31 and 32, k is the thermal conductivity of the material 33, and L is the thickness of the material 33.

The present invention has been described as a wireless passive temperature sensor. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A wireless passive temperature sensor, comprising:
 a surface acoustic wave delay line comprising,
  a piezoelectric substrate having a thermal coefficient of frequency, a launch interdigital transducer, disposed on the surface of the piezoelectric substrate and adapted to launch a surface acoustic wave at a resonance frequency in the piezoelectric substrate when a RF electric field is applied across the launch interdigital transducer, and a reflection interdigital transducer, disposed in the acoustic path of and spaced a delay length from the launch interdigital transducer on the piezoelectric substrate and adapted to at least partially reflect the launched surface acoustic wave back to the launch interdigital transducer; and an antenna adapted to receive a transmitted RF pulse and apply the RF electric field across the launch interdigital transducer to launch the surface acoustic wave, and to retransmit an RF pulse from the reflected surface acoustic wave received by the launch interdigital transducer; and wherein the delay time between the launched surface acoustic wave and the received reflected surface acoustic wave at the launch interdigital transducer is dependent on the thermal coefficient of frequency of the piezoelectric substrate.

2. The temperature sensor of claim 1, further comprising a remote burst transmitter adapted to transmit to the antenna the transmitted RF pulse with a carrier tuned the resonance frequency of the launch interdigital transducer.

3. The temperature sensor of claim 2, further comprising a reader adapted to receive the retransmitted RF pulse from the antenna.

4. The temperature sensor of claim 1, wherein the piezoelectric substrate comprises lithium niobate, lithium tantalate, gallium arsenide, or quartz.

5. An addressable array comprising at least two wireless passive temperature sensors, each temperature sensor comprising:

a surface acoustic wave delay line comprising,
    a piezoelectric substrate having a thermal coefficient of frequency,
    a launch interdigital transducer, disposed on the surface of the piezoelectric substrate and adapted to launch a surface acoustic wave at a resonance frequency in the piezoelectric substrate when a RF electric field is applied across the launch interdigital transducer, and
    a reflection interdigital transducer, disposed in the acoustic path of and spaced a delay length from the launch interdigital transducer on the piezoelectric substrate and adapted to at least partially reflect the launched surface acoustic wave back to the launch interdigital transducer; and
an antenna adapted to receive a transmitted RF pulse and apply the RF electric field across the launch interdigital transducer to launch the surface acoustic wave, and to retransmit an RF pulse from the reflected surface acoustic wave received by the launch interdigital transducer; and
wherein the delay time between the launched surface acoustic wave and the received reflected surface acoustic wave of the launch interdigital transducer is dependent on the thermal coefficient of frequency of the piezoelectric substrate; and wherein the resonance frequency and/or the delay time of each of the temperature sensors is different.

6. The addressable array of claim 5, further comprising a remote burst transmitter adapted to transmit to each antenna a series of transmitted RF pulses, each pulse having a carrier tuned to a different resonance frequency of each of the launch interdigital transducers.

7. The addressable array of claim 6, further comprising a reader adapted to receive the retransmitted RF pulses from each antenna.

8. The addressable array of claim 5, wherein the piezoelectric substrate of each sensor comprises lithium niobate, lithium tantalate, gallium arsenide, or quartz.

9. The addressable array of claim 5, wherein each sensor is pre-positioned for spatial thermal measurement of a remote structure.

10. The addressable array of claim 9, wherein the remote structure comprises a satellite.

11. A wireless passive heat flux gauge, comprising:

a thermal conductor having a known thermal conductivity and thickness, a first and a second wireless passive temperature sensor disposed on opposite sides of the thermal conductor, each sensor comprising:

a surface acoustic wave delay line comprising,
    a piezoelectric substrate having a thermal coefficient of frequency,
    a launch interdigital transducer, disposed on the surface of the piezoelectric substrate and adapted to launch a surface acoustic wave at a resonance frequency in the piezoelectric substrate when a RF electric field is applied across the launch interdigital transducer, and
    a reflection interdigital transducer, disposed in the acoustic path of and spaced a delay length from the launch interdigital transducer on the piezoelectric substrate and adapted to at least partially reflect the launched surface acoustic wave back to the launch interdigital transducer; and
an antenna adapted to receive a transmitted RF pulse and apply the RF electric field across the launch interdigital transducer to launch the surface acoustic wave, and to retransmit an RF pulse from the reflected surface acoustic wave received by the launch interdigital transducer; and
wherein the delay time between the launched surface acoustic wave and the received reflected surface acoustic wave of the launch interdigital transducer is dependent on the thermal coefficient of frequency of the piezoelectric substrate; and wherein the resonance frequency and/or the delay time of each of the first and second temperature sensors is different.

* * * * *